US010047501B2

(12) United States Patent
Ishida et al.

(10) Patent No.: US 10,047,501 B2
(45) Date of Patent: Aug. 14, 2018

(54) CONTROL DEVICE OF CONSTRUCTION MACHINE

(71) Applicant: Hitachi Construction Machinery Co., Ltd., Tokyo (JP)

(72) Inventors: Seiji Ishida, Hitachinaka (JP); Shinya Imura, Toride (JP); Masafumi Hita, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 353 days.

(21) Appl. No.: 15/053,080

(22) Filed: Feb. 25, 2016

(65) Prior Publication Data

US 2017/0009427 A1    Jan. 12, 2017

(30) Foreign Application Priority Data

Jul. 7, 2015   (JP) .................... 2015-135980

(51) Int. Cl.
*B60L 1/00* (2006.01)
*E02F 9/20* (2006.01)
(Continued)

(52) U.S. Cl.
CPC ............ *E02F 9/2091* (2013.01); *B60K 35/00* (2013.01); *B60L 1/003* (2013.01); *B60L 11/02* (2013.01);
(Continued)

(58) Field of Classification Search
CPC .... B60L 11/02; B60L 11/123; B60L 11/1857; B60L 11/1861; B60L 11/1872; E02F 9/2091
(Continued)

(56) References Cited

U.S. PATENT DOCUMENTS

| 2009/0026838 A1* | 1/2009 | Abe ......................... B60L 1/00 307/10.1 |
| 2014/0103874 A1* | 4/2014 | Ishida ................. B60L 11/1809 320/109 |
| 2016/0031328 A1* | 2/2016 | Lindsey .................. B60L 11/08 307/10.1 |

FOREIGN PATENT DOCUMENTS

| EP | 1 383 224 A1 | 1/2004 |
| EP | 1 526 627 A2 | 4/2005 |

(Continued)

*Primary Examiner* — Thomas Skibinski
(74) *Attorney, Agent, or Firm* — Crowell & Moring LLP

(57) ABSTRACT

A control device of construction machine that performs tasks by driving a hydraulic pump by means of an electric motor that is driven by electric power of a battery device that is capable to charge and discharge and an engine that is mechanically coupled to the electric motor, includes: a charging/discharging control unit that controls the charging/discharging of the battery device in such a manner that, in case that a heavy load task where an output of the hydraulic pump is large and a light load task where the output of the hydraulic pump is small are alternately performed, when the output of the hydraulic pump during the heavy load task is increased or a time proportion of the heavy load task in the unit period is increased, an average value of charging current of the battery device per the unit period increases, and when the output of the hydraulic pump during the heavy load task is further increased or the time proportion of the heavy load task in the unit period is further increased, then the average value of the charging current of the battery device per the unit period decreases.

8 Claims, 9 Drawing Sheets

(51) Int. Cl.
*B60L 11/02* (2006.01)
*B60L 11/12* (2006.01)
*B60L 11/18* (2006.01)
*B60K 35/00* (2006.01)
*G05B 15/02* (2006.01)
*H02J 7/00* (2006.01)
*B60K 6/485* (2007.10)
*E02F 3/32* (2006.01)

(52) U.S. Cl.
CPC ......... *B60L 11/123* (2013.01); *B60L 11/1857* (2013.01); *B60L 11/1861* (2013.01); *B60L 11/1872* (2013.01); *E02F 9/2075* (2013.01); *G05B 15/02* (2013.01); *H02J 7/007* (2013.01); *H02J 7/0047* (2013.01); *B60K 6/485* (2013.01); *B60K 2350/352* (2013.01); *B60L 2200/40* (2013.01); *B60L 2240/545* (2013.01); *B60L 2240/549* (2013.01); *B60Y 2200/412* (2013.01); *B60Y 2300/91* (2013.01); *E02F 3/32* (2013.01); *H02J 2007/005* (2013.01); *Y02T 10/6217* (2013.01); *Y02T 10/7005* (2013.01); *Y02T 10/705* (2013.01); *Y02T 10/7044* (2013.01); *Y02T 10/7077* (2013.01); *Y10S 903/903* (2013.01)

(58) Field of Classification Search
USPC .......................... 307/9.1, 10.1, 10.7; 320/127
See application file for complete search history.

(56) References Cited

FOREIGN PATENT DOCUMENTS

| | | |
|---|---|---|
| EP | 2 418 504 A1 | 2/2012 |
| EP | 2 670 019 A1 | 12/2013 |
| JP | 5-287780 A | 11/1993 |
| JP | 11187577 A | 7/1999 |
| JP | 2002325379 A | 11/2002 |
| JP | 2003219510 A | 7/2003 |
| JP | 2005124353 A | 5/2005 |
| JP | 2006149181 A | 6/2006 |
| JP | 2007288906 A | 11/2007 |
| JP | 2007-321671 A | 12/2007 |
| JP | 2010-25179 A | 2/2010 |
| JP | 2010041828 A | 2/2010 |
| JP | 2010193630 A | 9/2010 |
| JP | 2011079447 A | 4/2011 |
| KR | 10-2011-0132427 A | 12/2011 |
| KR | 10-2014-0032364 A | 3/2014 |

* cited by examiner

CONTROL DEVICE OF CONSTRUCTION MACHINE

INCORPORATION BY REFERENCE

The disclosure of the following priority application is herein incorporated by reference: Japanese Patent Application No. 2015-135980 filed Jul. 7, 2015.

BACKGROUND OF THE INVENTION

1. Field of Invention

The present invention relates to a control device of a construction machine that performs tasks with hydraulic pressure, by driving a hydraulic pump by means of an engine and an electric motor.

2. Description of Related Art

A control device of a battery mechanism has been known that performs a process of tightening a limit of charging/discharging power of a battery if a degree of deterioration of the battery is larger than a predetermined degree, and loosening the limit of the charging/discharging power of the battery if the degree of deterioration of the battery is smaller than the predetermined degree (see Japanese Laid-Open Patent Publication No. 2005-124353).

SUMMARY OF THE INVENTION

However, in the technology described in Japanese Laid-Open Patent Publication No. 2005-124353, because of the configuration in which the limit of the charging/discharging power of the battery device is tightened if the degree of deterioration of the battery device becomes large, the battery device may not supply enough power to the electric motor if the degree of deterioration is large, even though power supply from the battery device is necessary.

In a construction machine that performs tasks with hydraulic pressure by driving a hydraulic pump by means of an engine and an electric motor, the electric motor is operated as follows. If the power required by the hydraulic pump exceeds the power that the engine can output, the electric motor is operated with the power discharged by the battery device and the hydraulic pump is driven by means of both the engine and the electric motor. If the power required by the hydraulic pump is small, the electric motor is operated as a generator with the power of the engine, so that the battery device is charged. Thereby, the discharged power may be compensated for, so that the state of charge of the battery device can be maintained.

In the construction machine, the charging/discharging current of the battery device is large and the degree of deterioration of the battery device is large when a high load task is performed such as a task in which a high hydraulic load acts repeatedly. In the technology described in Japanese Laid-Open Patent Publication No. 2005-124353, the limit of the charging/discharging power of the battery device is tightened if the degree of deterioration is large. Therefore, even if the operator wants to perform the high load task, enough power required for the hydraulic pump is not supplied from the electric motor. As a result, the task is limited and an amount of task can be reduced. In addition, operability is poor because the task cannot be performed according to operation of the operator.

According to the first aspect of the present invention, a control device of construction machine that performs tasks by driving a hydraulic pump by means of an electric motor that is driven by power of a battery device that is capable to charge and discharge and an engine that is mechanically coupled to the electric motor, comprises: a charging/discharging control unit that controls the charging/discharging of the battery device in such a manner that, in case that a heavy load task where an output of the hydraulic pump is large and a light load task where the output of the hydraulic pump is small are alternately performed, when the output of the hydraulic pump during the heavy load task is increased or a time proportion of the heavy load task in the unit period is increased, an average value of charging current of the battery device per the unit period increases, and when the output of the hydraulic pump during the heavy load task is further increased or the time proportion of the heavy load task in the unit period is further increased, then the average value of the charging current of the battery device per the unit period decreases According to the second aspect of the present invention, in the control device of the construction machine of the first aspect, it is preferred that the control device of the construction machine further comprises, a storage device that stores a charging current limit value that is set for limiting the charging current of the battery device, wherein: the charging/discharging control unit is configured to include a limit value changing unit that changes the magnitude of the charging current limit value, and a determination value setting unit that sets a determination value that is an indicator indicating a degree of deterioration of the battery device; and if the determination value is larger than a threshold, the limit value changing unit changes the magnitude of the charging current limit value to be smaller than the magnitude in the case where the determination value is smaller than the threshold According to the third aspect of the present invention, in the control device of the construction machine of the first aspect, it is preferred that the control device of the construction machine further comprises a storage device that stores a charging current limit value that is set for limiting the charging current of the battery device and a discharging current limit value that is set for limiting the discharging current of the battery device, wherein: the charging/discharging control unit is configured to include a limit value changing unit that changes the magnitude of the charging current limit value, and a determination value setting unit that sets a determination value that is an indicator indicating a degree of deterioration of the battery device; and the limit value changing unit changes the magnitude of the charging current limit value to be smaller than the magnitude of the discharging current limit value if the determination value is larger than a threshold.

According to the fourth aspect of the present invention, in the control device of the construction machine of the third aspect, it is preferred that a difference, between the magnitude of the charging current limit value of the battery device in case that a difference, between the magnitude of the charging current limit value of the battery device in case that the determination value is smaller than the threshold and the magnitude of the charging current limit value of the battery device in case that the determination value is larger than the threshold, is larger than a difference, between the magnitude of the discharging current of the battery device in case that the determination value is smaller than the threshold and the magnitude of the discharging current limit value of the battery device in case that the determination value is larger than the threshold.

According to the fifth aspect of the present invention, in the control device of the construction machine of any one of the second through fourth aspects, it is preferred that the control device of the construction machine further comprises a current detecting unit that detects the charging/discharging current flowing into and out of the battery device; and an average charging/discharging current calculating unit that calculates an average value of the charging/discharging current detected by the current detecting unit, wherein the determination value is an average value of the charging/discharging current calculated by the average charging/discharging current calculating unit.

According to the sixth aspect of the present invention, in the control device of the construction machine of any one of the second through fourth aspects, it is preferred that the control device of the construction machine further comprises a temperature detecting unit that detects the temperature of the battery device, wherein the determination value is the temperature that is detected by the temperature detecting unit.

According to the seventh aspect of the present invention, in the control device of the construction machine of any one of the first through sixth aspects, it is preferred that the control device of the construction machine further comprises a state of charge determining unit that determines whether the state of charge of the battery device is smaller than a predetermined value or not; and a display control unit that switches an image displayed on a display screen of the display device to display at least information of the state of charge of the battery device on the image displayed on the display screen, when it is determined by the state of charge determining unit that the state of charge of the battery device is smaller than the predetermined value.

According to the first aspect of the present invention, a control device of construction machine that performs tasks by driving a hydraulic pump by means of an electric motor that is driven by power of a battery device that is capable to charge and discharge and an engine that is mechanically coupled to the electric motor, wherein: a difference, between a magnitude of a charging current limit value of the battery device in case that an average value of a charging/discharging current of the battery device is small and a magnitude of a charging current limit value of the battery device in case that an average value of a charging/discharging current of the battery device is large, is larger than a difference, between a magnitude of a discharging current limit value of the battery device in case that an average value of a charging/discharging current of the battery device is small and a magnitude of a discharging current limit value of the battery device in case that an average value of a charging/discharging current of the battery device is large.

DESCRIPTION OF EMBODIMENTS

Figure 1:
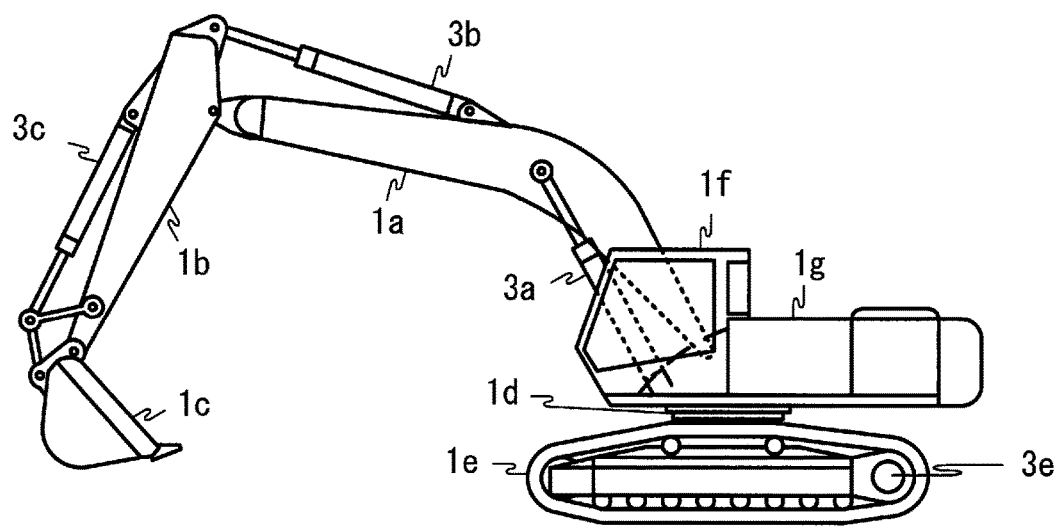
FIG. 1 is a side view of a hydraulic excavator according to the present embodiment.

Referring to the drawings, one embodiment of a control device of a construction machine according to the present invention will now be described.

FIG. 1 is a side view of a hydraulic excavator as one example of the construction machine equipped with the control device according to the present embodiment. In the hydraulic excavator, a variety of actuators are driven by a hydraulic pump so that a variety of tasks are performed.

The hydraulic excavator has a travel body 1e and a swing body (a body frame) 1g that is swingably mounted on the travel body 1e via a swing mechanism 1d. The travel body 1e is equipped with a hydraulic motor for traveling (hereinafter referred to as a travel motor 3e) and the travel body 1e travels by means of the drive of the travel motor 3e. It will be noted that the travel body 1e and the travel motor 3e are also provided on the other side of the vehicle body and the pair of the travel motors 3e, 3e are driven independently to each other.

The swing body 1g is provided with a driver room if that an operator boards, and a multi-articulated front working device. The front working device is configured to include a boom 1a, an arm 1b, and a bucket 1c. The boom 1a is, at its base end, rotatably mounted on a front part of the swing body 1g. The arm 1b is, at its one end, rotatably mounted at the tip end of the boom 1a. The boom 1a and the arm 1b are driven by a boom cylinder 3a and an arm cylinder 3b, respectively, to swing upwardly and downwardly. The bucket 1c is mounted at the tip end of the arm 1b in such a manner that the bucket 1 can rotate in the up and down direction. The bucket 1c is driven by a bucket cylinder 3c.

The swing body 1g is equipped with a diesel engine (hereinafter, referred to as an engine) that is an internal combustion engine, an electric motor, and hydraulic equipment such as a hydraulic pump that is a hydraulic pressure generator or control valves. In the driver room 1f, an operating members and display devices are disposed, such as a rotational speed setting dial for setting a rotational speed of the engine, an operating member for the front working device, an operating member for traveling, an operating member for swinging, etc.

Figure 2:
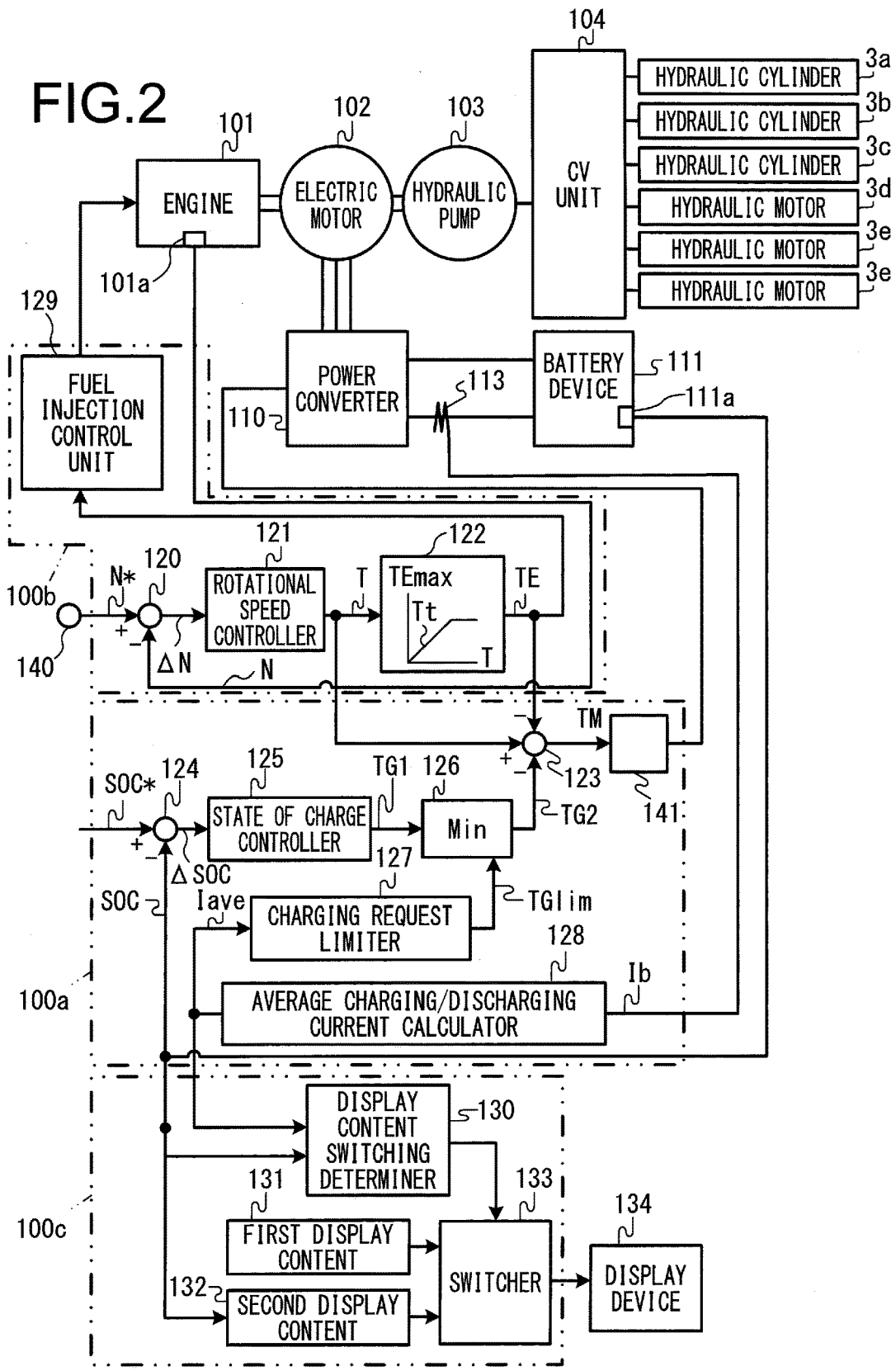
FIG. 2 is a view showing a configuration of the hydraulic excavator according to the present embodiment.

FIG. 2 is a view showing a configuration of the hydraulic excavator according to the present embodiment. An engine 101 and an electric motor 102 are mechanically coupled to each other so that they rotate at the same rotational speed. A hydraulic pump 103 is mechanically coupled to the electric motor 102 and driven by means of the engine 101 and the electric motor 102 to discharge hydraulic oil.

The hydraulic oil discharged from the hydraulic pump 103 is distributed by a control valve unit 104 based on operation of the variety of operating members performed by the operator, so that the hydraulic oil is supplied to the boom cylinder 3a, the arm cylinder 3b, the bucket cylinder 3c, a swing motor 3d for swinging for driving the swing mechanism 1d, and right and left travel motors 3e, 3e in order to drive the actuators 3a through 3e.

A power converter 110 converts DC power from the rechargeable battery device 111 to AC power, which is then output to the electric motor 102, or the power converter 110 converts AC power from the electric motor 102 to DC power, which is then output to the battery device 111. The battery device 111 is a power source for supplying power to the electric motor 102 and is provided with a plurality of battery elements such as capacitors or secondary batteries.

The electric motor 102 is a three-phase synchronous electric motor having a built-in permanent magnet, for example, and is driven by the three-phase AC power that is converted by the power converter 110, in order to generate a rotational torque. The electric motor 102 is also driven by the engine 101 so as to function as a generator for generating the three-phase AC power. When the electric motor 102 operates as a generator, the AC power output from the electric motor 102 is converted into DC power by the power converter 110 so that the battery device 111 is charged with the DC power converted by the power converter 110.

The control device according to the present embodiment is configured to include a main controller 100a, an engine controller 100b, and a display controller 100c. Each controller 100a, 100b, 100c is configured to include a processing unit having CPUs, ROMs and RAMs that are storage devices, and other peripheral circuits, and others. The main controller 100a comprises a state of charge controller 125, a minimum value selecting circuit 126, a charging request limiter 127, an average charging/discharging current calculator 128, an electric motor torque limiter 141, an adder-subtractor 123, and a subtractor 124. The engine controller 100b includes a fuel injection control unit 129, a rotational speed controller 121, an engine torque limiter 122, and a subtractor 120. The display controller 100c includes a display content switching determiner 130 and a switcher 133.

A rotational speed setting dial 140 is connected to the engine controller 100b so that a rotational speed command value N* corresponding to the rotational speed set by the operator may be input. An engine speed detector 101a that detects a rotational speed N of the engine 101 is connected to the engine controller 100b, so that a signal corresponding to the rotational speed N of the engine 101 detected by the engine rotating detector 101a may be input.

A current detector 113 is also connected to the main controller 100a. The current detector 113 detects charging current and discharging current (hereinafter, referred to as charging/discharging current) that flow into and out of the battery device 111, so that the signal corresponding to the charging/discharging current Ib detected by the current detector 113 may be input. Furthermore, a SOC detector 111a is connected to the main controller 100a. The SOC detector 111a detects a state of charge SOC of the battery device 111, so that the signal corresponding to the SOC detected by the SOC detector 111a may be input. The signal corresponding to the state of charge SOC, which is input to the main controller 100a, is also input to the display controller 100c via the main controller 100a. A display device 134 is connected to the display controller 100c so that display images of the display controller 134 are controlled according to the signal output from the display controller 100c.

The subtractor 120 subtracts the rotational speed N detected by the engine speed detector 101a from the rotational speed command value N* output from the rotational speed setting dial 140, in order to determine a speed deviation $\Delta N$ between N* and N, which is then output to the rotational speed controller 121.

Based on the speed deviation $\Delta N$ between the rotational speed command value N* and the rotational speed N, the rotational speed controller 121 determines a torque command value T so that the speed deviation $\Delta N$ is 0, i.e. determines the torque command value T so that the rotational speed N is equal to the rotational speed command value N*, and outputs the torque command value T to the engine torque limiter 122. The torque command value T is also output to the adder/subtractor 123.

A torque limiting property Tt is stored in a storage device of the engine controller 100b in a form of a look-up table. The torque limiting property Tt is a property representing the maximum engine torque TEmax that is an upper limit value of the output torque for the torque command value T. The engine torque limiter 122 refers to the torque limiting property Tt and calculates the maximum engine torque TEmax for the input torque command value T. The engine torque limiter 122 compares the calculated maximum engine torque TEmax and the input torque command value T and selects the smaller one of these in order to output the selected value to the fuel injection control unit 129, as the engine torque command value TE. In other words, the engine torque command value TE is limited to be equal to or smaller than the maximum engine torque TEmax. The engine torque command value TE is also output to the adder/subtractor 123.

The fuel injection control unit 129 controls a fuel injection device (not shown) to determine a fuel injection quantity and the like so that an output torque of the engine 101 (hereinafter, also referred to as an engine torque) is equal to the engine torque command value TE.

The subtractor 124 subtracts the state of charge SOC detected by the SOC detector 111a from the state of charge command value SOC* from a battery controller (not shown) and determines a deviation $\Delta SOC$ between SOC* and SOC, and outputs it to the SOC controller 125. For example, the state of charge command value SOC* is a constant value that corresponds to the state of charge of 80%.

Based on the deviation $\Delta SOC$ between the state of charge command value SOC* and the state of charge SOC, the SOC controller 125 determines a first power generation torque request value TG1 so that the deviation $\Delta SOC$ is 0, i.e. the state of charge SOC is equal to the state of charge command value SOC*, and outputs the first power generation torque request value TG1 to the minimum value selecting circuit 126. If the state of charge command value SOC* is larger than the state of charge SOC, the first power generation torque request value TG1 is a positive value, while if the state of charge command value SOC* is smaller than the state of charge SOC, the first power generation torque request value TG1 is a negative value.

The average charging/discharging current calculator 128 calculates an average charging/discharging current Iave that is an average value of the charging/discharging current Ib flowing into and out of the battery device 111 detected by the current detector 113. The average charging/discharging current calculator 128 determines the average charging/discharging current Iave by averaging the magnitude of the charging/discharging current Ib with a first low-pass filter and outputs it to the charging request limiter 127. The charging/discharging current Iave is also output to the display content switching determiner 130.

It will be noted that a moving average method or a method of calculating the average value at a predetermined time interval may be employed as the method of determining the average charging/discharging current Iave. Furthermore, a mean square value may be used instead of the average charging/discharging current Iave, and electric power may be used instead of electric current.

Based on the average charging/discharging current Iave, the charging request limiter 127 calculates a power generation torque request TGlim and outputs it to the minimum value selecting circuit 126. The average charging/discharging current Iave is an indicator that indicates a degree of deterioration of the battery device 111 and the average charging/discharging current Iave is a determination value used for selecting whether the magnitude of the power generation torque request limit value TGlim corresponding to the limit value of the charging current of the battery device 111 is set to 0 or the maximum generator torque TGmax. Details of operation of the charging request limiter 127 will be described hereinafter.

The minimum value selecting circuit 126 compares the first power generation torque request value TG1 and the power generation torque request limit value TGlim and select the smaller one of these and outputs the selected value as the second power generation torque request value TG2.

The adder/subtractor 123 subtracts the engine torque command value TE and the second power generation torque request value TG2 from the torque command value T to determine the electric motor torque command value TM and outputs it to the electric motor torque limiter 141. If the electric motor torque command value TM is a positive value, the electric motor 102 is driven by the power supplied from the battery device 111. On the other hand, if the electric motor torque command value TM is a negative value, the electric motor 102 is driven as a generator by means of the engine 101. It will be noted that since the engine torque command value TE is equal to or lower than the torque command value T, the electric motor torque command value TM is larger than the value of which the sign of the second power generation torque request value TG2 is inverted. In other words, if the electric motor torque command value TM is a negative value, the magnitude of the electric motor torque command value TM is smaller than the magnitude of the power generation torque request limit value TGlim.

The electric motor torque limiter 141 compares the input electric motor torque command value TM and the maximum electric motor torque TMmax to select the smaller one of these and outputs the selected value to the power converter 110, as the electric motor torque command value TM. In other words, the electric motor torque command value TM is limited to be equal to or less than the maximum electric motor torque TMmax.

The maximum electric motor torque TMmax is a positive value and is determined under the consideration of an acceptable torque of the electric motor 102 in case that the electric motor 102 is driven by the power of the battery device 111. The maximum electric motor torque TMmax is previously stored in the storage device of the main controller 100a.

In other words, if the electric motor 102 is driven by the power of the battery device 111, the discharging current of the battery device 111 is limited to be equal to or lower than the maximum discharging current required for obtaining the maximum electric motor torque TMmax. In other words, a discharging current limit value that is set for limiting the discharging current of the battery device 111 is set based upon the maximum electric motor torque TMmax. It will be noted that only a case where the electric motor torque command value TM input to the electric motor torque limiter 141 is smaller than the maximum electric motor torque TMmax will be described in this specification. In other words, the electric motor torque command value output from the electric motor torque limiter 141 is the same as the electric motor torque command value TM input to the electric motor torque limiter 141.

The power converter 110 controls the electric motor 102 so that the output torque of the electric motor 102 (hereinafter, also referred to as an electric motor torque) is equal to the electric motor torque command value TM. For example, the power converter 110 has a plurality of switching elements for converting DC power into three-phase AC power, and a control unit that performs a PWM control on switching of these switching elements so that the electric current flowing into the electric motor 102 is consistent with the electric current command corresponding to the electric motor torque command value TM. The control unit of the power converter 110 controls the switching elements to convert the DC power output from the battery device 111 into the three-phase AC power in order to drive the electric motor 102. Furthermore, when the electric motor 102 operates as a generator, the control unit controls the switching elements to convert the three-phase AC power output from the electric motor 102 into the DC power in order to charge the battery device 111.

The display device 134 is a monitor that displays information for the operator to know the state of the construction machine. The display device 134 displays either a first display content 131 or a second display content 132 that is selected by a switcher 133, based on a switching signal output from the display content switching determiner 130. The first display content 131 is a display content that represents information such as the temperature of an engine coolant or the engine rotational speed and the first display content 131 is set based on the information from a coolant temperature detector (not shown) or the engine speed detector 101a. The second display content 132 is a display content that includes at least the state of charge SOC of the battery device 111 and the second display content 132 is set based on a signal corresponding to the state of charge SOC detected by the SOC detector 111a.

The signal corresponding to the state of charge SOC detected by the SOC detector 111a and the signal corresponding to the average charging/discharging current Iave calculated by the average charging/discharging current calculator 128 are input to the display content switching determiner 130.

The display content switching determiner 130 determines whether the average charging/discharging current Iave is equal to or higher than a threshold It and the state of charge SOC is equal to or lower than a threshold SOCt or not. If the average charging/discharging current Iave is equal to or higher than the threshold It and the state of charge SOC is equal to or lower than the threshold SOCt, the display content switching determiner 130 outputs a second switching signal to the switcher 133, the signal switching the image to be displayed on a display screen of the display device 134 from the first display content 131 to the second display content 132. The threshold SOCt and the threshold It are previously stored in the storage device. The threshold SOCt is a constant value that corresponds to the state of charge of 40%, for example. The threshold It is the same as a second threshold I2 described hereinafter. If the average charging/discharging current Iave is lower than the threshold It or if the state of charge SOC is higher than the threshold SOCt, the display content switching determiner 130 outputs a first switching signal to the switcher 133, the signal switching the image to be displayed on the display screen of the display device 134 from the second display content 132 to the first display content 131.

If the second switching signal is input, the switcher 133 switches the image to be displayed on the display device 134 to the second display content 132. Thereby, the content including the state of charge SOC is displayed on the display device 134. If the first switching signal is input, the switcher 133 switches the image to be displayed on the display device 134 to the first display content 131. Thereby, the information such as the temperature of the engine coolant or the engine rotational speed is displayed on the display device 134.

Figure 3:
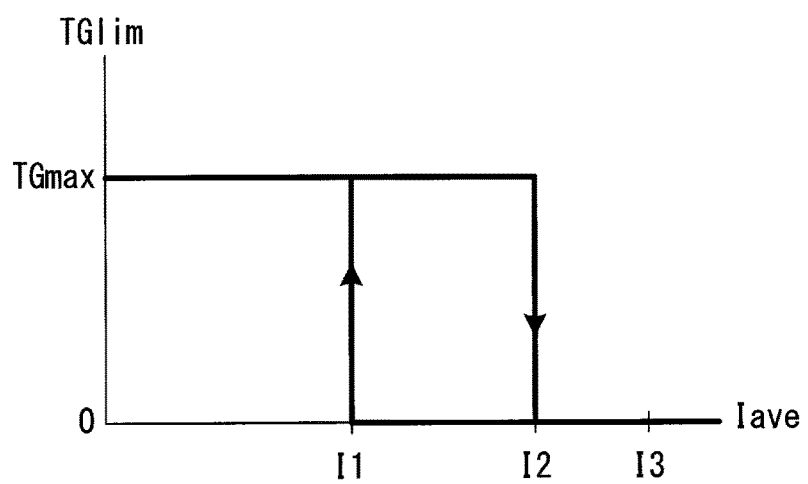
FIG. 3 is a view showing the relationship between an average charging/discharging current and a power generation torque request limit value.

Referring to FIG. 3, details of operation of the charging request limiter 127 will be described. FIG. 3 is a view showing the relationship between the average charging/discharging current Iave and the power generation torque request limit value TGlim. If the average charging/discharging current Iave is equal to or lower than a first threshold I1 (Iave≤I1), the charging request limiter 127 sets the power generation torque request limit value TGlim to the maximum generator torque TGmax. If the average charging/discharging current Iave is equal to or higher than a second threshold I2 (Iave>I2), the charging request limiter 127 sets the power generation torque request limit value TGlim to 0.

The power generation torque request limit value TGlim has hysteresis characteristics. Once the power generation torque request limit value TGlim is set to 0, it remains 0 until the average charging/discharging current Iave is equal to or lower than the first threshold I1. When the average charging/discharging current Iave is equal to or lower than the first threshold I1, the magnitude of the power generation torque request limit value TGlim is changed from 0 to the maximum generator torque TGmax. Similarly, once the power generation torque request limit value TGlim is set to the maximum generator torque TGmax, it remains TGmax until the average charging/discharging current Iave is equal to or higher than the second threshold I2. When the average charging/discharging current Iave is equal to or higher than the second threshold I2, the magnitude of the power generation torque request limit value TGlim is changed from TGmax to 0. The maximum generator torque TGmax has a positive value and is determined under the consideration of an acceptable torque of the electric motor 102 in case that the electric motor 102 is driven as a generator by means of the engine 101. The maximum generator torque TGmax is previously stored in the storage device of the main controller 100a. In the present embodiment, the maximum generator torque TGmax is set to have the same value as that of the maximum electric motor torque TMmax (TGmax=TMmax).

It will be noted that a third threshold I3 in the figure is determined under the consideration of the value of the average charging/discharging current Iave above which a desired service life could not be ensured due to a rapid deterioration of the battery device 111. The third threshold is previously stored in the storage device. In other words, by controlling the charging/discharging current so that the average charging/discharging current Iave is equal to or lower than the third threshold I3, the desired service life of the battery device 111 can be ensured. The first threshold I1 and the second threshold I2 are determined to have a smaller value than that of the third threshold, with the magnitude relationship I1<I2<I3. They are previously stored in the storage device.

For example, if the torque command value T and the engine torque command value TE are the same and the electric motor 102 operates as a generator, the electric motor torque command value TM output from the adder/subtractor 123 is equal to the value of which the sign of the second power generation torque request value TG2 output from the minimum value selecting circuit 126 as shown in FIG. 2. The upper limit of the second power generation torque request value TG2 is limited to the power generation torque request limit value TGlim Therefore, the minimum value of the electric motor torque command value TM is −TGlim and the charging current flowing into the battery device 111 is limited. In other words, a charging current limit value that is set for limiting the charging current of the battery device 111 is set based upon the power generation torque request limit value TGlim is. The charging request limiter 127 has a function of changing the magnitude of the charging/discharging current limit value based on the average charging/discharging current Iave.

The magnitude of the power generation torque request limit value TGlim corresponding to the charging current limit value of the battery device 111 in case that the average charging/discharging current Iave is equal to or lower than the first threshold I1, is TGmax. On the other hand, the magnitude of the power generation torque request limit value TGlim as the charging current of the battery device 111 in case that the average charging/discharging current Iave is equal to or higher than the second threshold I2, is 0. The difference ΔC between both magnitudes is TGmax (ΔC=TGmax−0). In contrast, both the magnitude of the maximum electric motor torque corresponding to the discharging current limit value of the battery device 111 in case that the average charging/discharging current Iave is equal to or lower than the first threshold I1 and the magnitude of the maximum electric motor torque corresponding to the discharging current limit value of the battery device 111 in case that the average charging/discharging current Iave of the battery device 111 is equal to or higher than the second threshold I2 are TMmax, and the difference ΔD between both magnitudes is thus 0 (ΔD=TMmax−TMmax=0). In other words, the difference ΔC is larger than the difference ΔD (ΔC>ΔD).

As described above, the maximum electric motor torque, which corresponds to the discharging current limit value in the situation where the electric motor 102 is driven by the power of the battery device 111, is TMmax, regardless of the magnitude of the average charging/discharging current Iave. Furthermore, the power generation torque request limit value TGlim, which corresponds to the charging current limit value in the situation where the electric motor 102 is driven by the engine 101, is the maximum generator torque TGmax if the average charging/discharging current Iave is equal to or lower than the first threshold I1, and 0 if the average charging/discharging current Iave is equal to or higher than the second threshold I2. In other words, the power generation torque request limit value TGlim=0, which corresponds to the charging/discharging current limit value in case that the average charging/discharging current Iave is equal to or higher than the second threshold, is smaller than the maximum electric motor torque TMmax, which corresponds to the discharging current limit value in case that the average charging/discharging current Iave is equal to or higher than the second threshold I2.

Referring to FIG. 4 through FIG. 7, operation of the control device according to this embodiment will be described.

General task of the hydraulic excavator is an excavation. In the excavation, the boom 1a, the arm 1b, and the bucket 1c are operated for excavating, and the bucket 1c is then lifted up and swung to discharge excavated soil. After discharging the soil, the bucket swings again back to the next excavating position and repeats the task. In those operations, the excavation and the lifting-up of the bucket 1c require large power, while the swing and the soil discharge can be performed with relatively small power.

FIG. 4 through FIG. 7 are schematic timing charts showing operation of the control device for a pump torque TL of the hydraulic pump 103, assuming that the excavation is performed. Each figure shows operation of the control device in case that tasks with high hydraulic load (for example, the excavating operation or the bucket lifting-up operation) and tasks with low hydraulic load (for example, the swinging operation and the soil discharging operation) are alternately performed in a unit period. In the present specification, tasks with high hydraulic load (i.e. tasks where output of the hydraulic pump 103 is large) are defined as heavy load tasks, while tasks with low hydraulic load (i.e. tasks where output of the hydraulic pump 103 is small) are defined as light load tasks. Furthermore, the unit period is a period from a time point is to a time point to in the following description.

Figure 4:
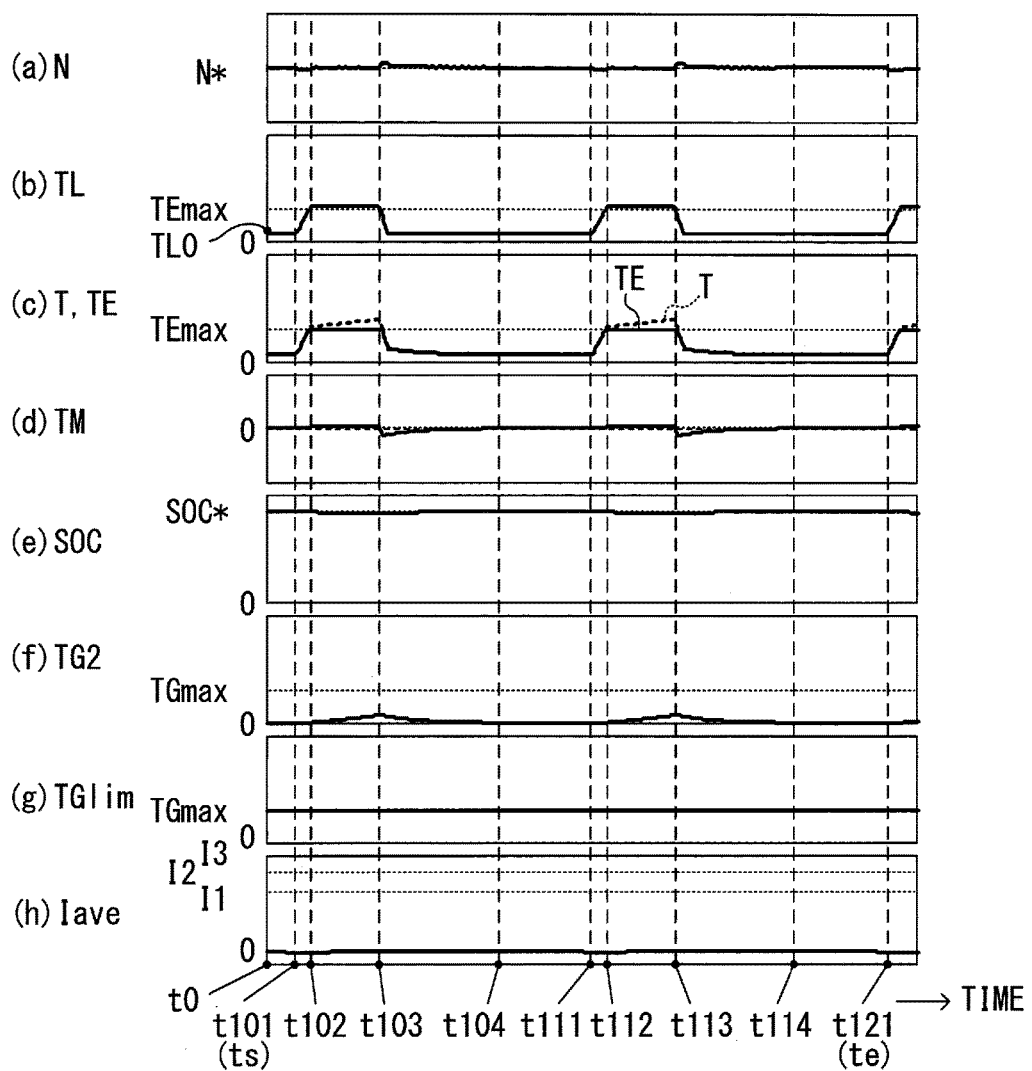
FIG. 4 is a timing chart showing operation of the control device in an average light load task.
Figure 5:
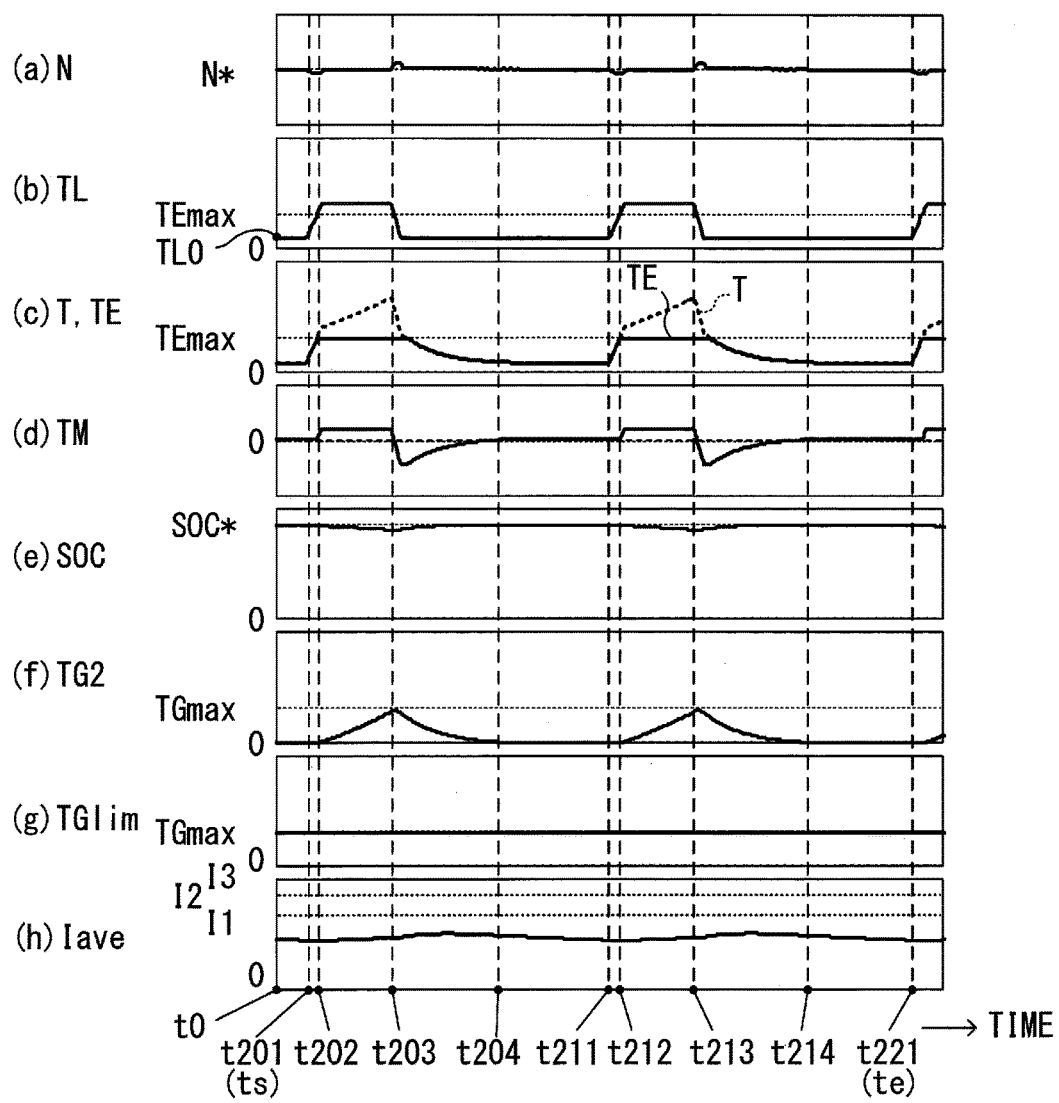
FIG. 5 is a timing chart showing operation of the control device in an average medium load task.
Figure 6:
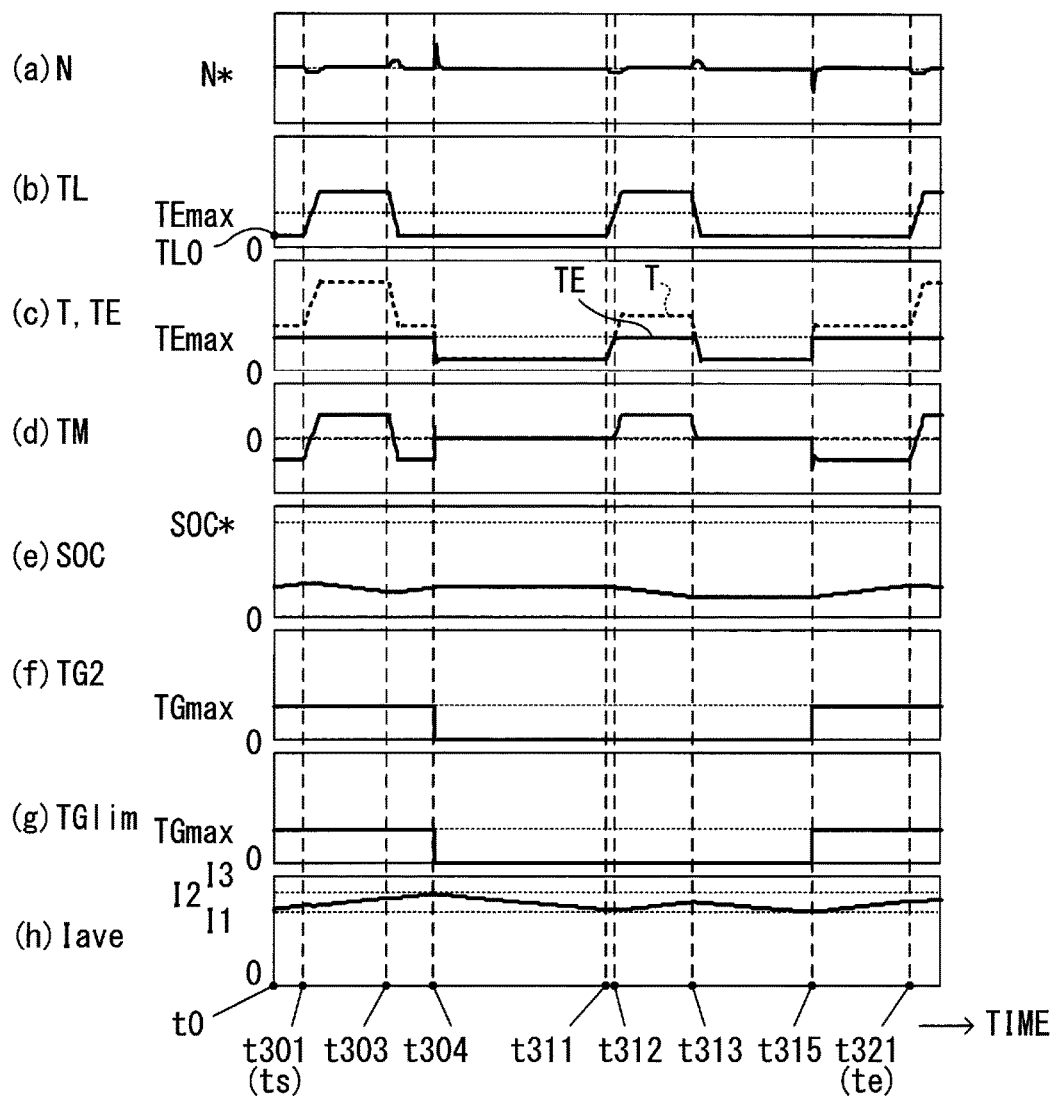
FIG. 6 is a timing chart showing operation of the control device in an average heavy load task.
Figure 7:
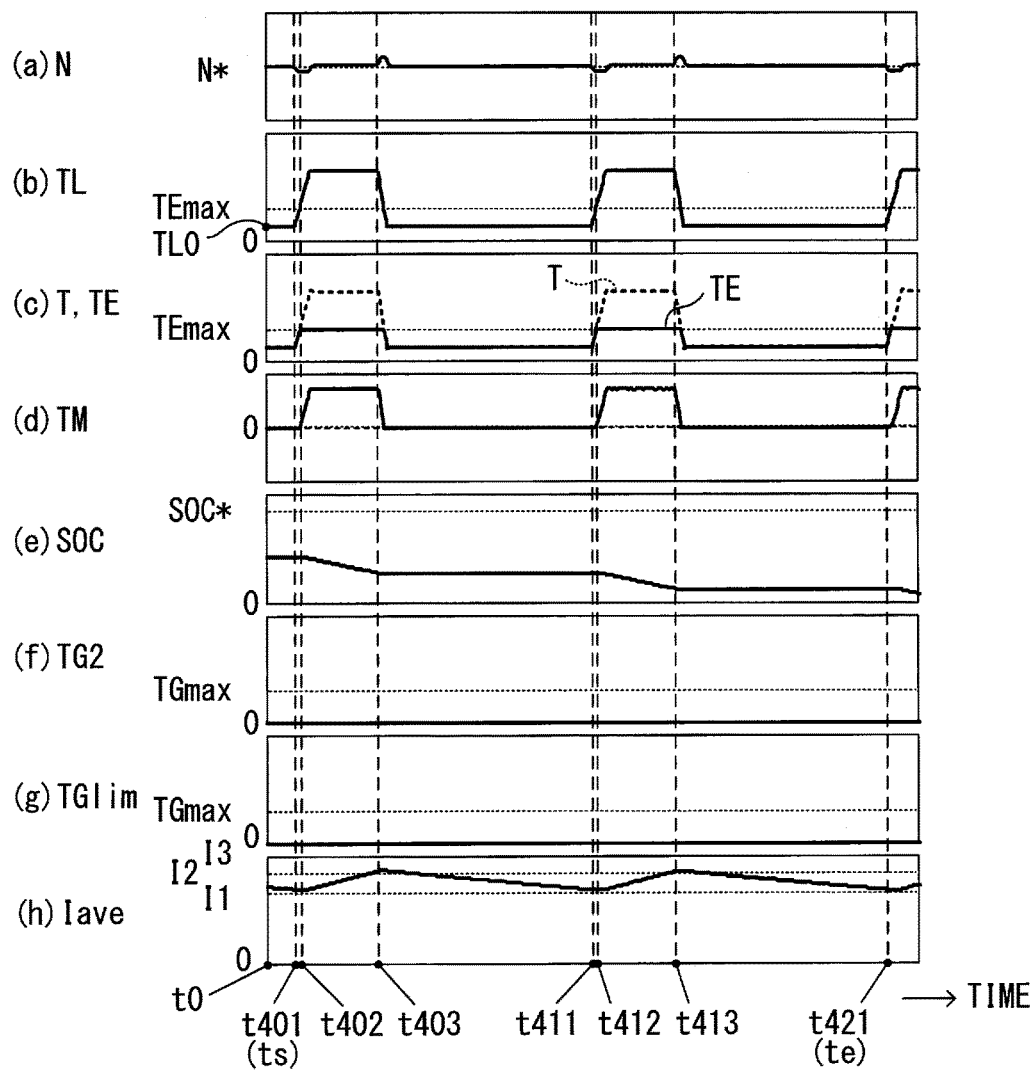
FIG. 7 is a timing chart showing operation of the control device in an average superheavy load task.

The pump torque TL repeats to increase and decrease between TL0 that is larger than 0 and a predetermined torque that is larger than TL0. Among the figures, FIG. 4 shows a task condition where the average value of the hydraulic load per unit period is smallest (hereinafter, referred to as average light load task). The average values of the hydraulic load per unit period in FIG. 5, FIG. 6, and FIG. 7 vary from lower to higher in this order of figures. FIG. 5 shows a task condition (hereinafter, referred to as average medium load task) where the average value of the hydraulic load per unit period is larger than that of the average light load task. FIG. 6 shows a task condition (hereinafter, referred to as average heavy load task) where the average value of the hydraulic load per unit period is larger than that of the average medium load task. FIG. 7 shows a task condition (hereinafter, referred to as average superheavy load task) where the average value of the hydraulic load per unit period is larger than that of the average heavy load task. It will be noted that the average value of the hydraulic load per unit period becomes higher as the output of the hydraulic pump 103 in the heavy load task is increased or as a time proportion of the heavy load task in the unit period is increased.

In each of FIG. 4 through FIG. 7, the abscissa represents elapsed time. The ordinate in (a) represents the rotational speed N of the engine 101 and the electric motor 102, the ordinate in (b) represents an input torque (hereinafter, also referred to as a pump torque) of the hydraulic pump 103 representing the hydraulic load. The ordinate in (c) represents the magnitude of the torque command value T (dashed line) and the magnitude of the engine torque command value TE (solid line). The ordinate in (d) represents the electric motor torque command value TM and the ordinate in (e) represents the state of charge SOC. The ordinate in (f) represents the second power generation torque request value TG2, the ordinate in (g) represents the power generation torque request limit value TGlim, and the ordinate in (h) represents the average charging/discharging current Iave.

—Average Light/Medium Load Task—

Referring to FIG. 4 and FIG. 5, operation of the control device in average light/medium load tasks will be described. Since the operations of the control device in the average light load task (FIG. 4) and the average medium load task (FIG. 5) are almost the same, the operation of the control device in the average medium load task will be representatively described and the description of the operation of the control device in the average light load task will be omitted.

FIG. 5 is a timing chart in which the state of charge SOC of the battery device 111 is equal to the state of charge command value SOC*, and a condition (at a time point t0) where the average charging/discharging current Iave is smaller than the first threshold I1 is set as the initial condition. It will be noted that TGlim is set to TGmax at the time point t0.

As shown in (b) in FIG. 5, when the pump torque TL begins to increase at a time point t201, the rotational speed N decreases slightly as shown in (a) in FIG. 5 so that the speed deviation ΔN between the rotational speed N and the rotational speed command value N* increases (N*>N). As the speed deviation ΔN increases, the torque command value T and the engine torque command value TE increase as shown in (c) in FIG. 5. Because the torque command value T is equal to or lower than the maximum engine torque TEmax in the period from the time point t201 to the time point t202, the engine torque command value TE is equal to the torque command value T. As the engine torque command value TE increases, the output torque of the engine 101 increases so that the rotational speed N returns to the rotational speed command value N* as shown in (a) in FIG. 5. In other words, the rotational speed N is controlled to be equal to the rotational speed command value N*.

As shown in (c) in FIG. 5, when the torque command value T exceeds the maximum engine torque TEmax at the time point t202, the engine torque command value TE is limited to the maximum engine torque TEmax. This results in a difference between the torque command value T and the engine torque command value TE, so that the electric motor torque command value TM output from the adder/subtractor 123 increases as shown in (d) in FIG. 5. In other words, torque assistance by the electric motor 102 occurs from the time point t202, so that the hydraulic pump 103 is driven by means of the engine 101 and the electric motor 102.

Although the engine torque command value TE is limited to the maximum engine torque TEmax in the period from the time point t202 to the time point t203, the output torque of the electric motor 102 increases with the increase in the electric motor torque command value TM, so that the rotational speed N is controlled to be equal to the rotational speed command value N* as shown in (a) in FIG. 5. When the electric motor 102 is driven by the power discharged from the battery device 111, the state of charge SOC of the battery device 111 decreases as shown in (e) in FIG. 5. As the state of charge SOC decreases, the deviation ΔSOC output from the subtractor 124 increases. Accordingly, the first power generation torque request value TG1 increases.

In the average medium load task, the average charging/discharging current Iave is equal to or lower than the first threshold I1 as shown in (h) in FIG. 5. Therefore, as shown in (g) in FIG. 5, the power generation torque request limit value TGlim is set to the maximum generator torque TGmax.

Since the first power generation torque request value TG1 (not shown) is smaller than the power generation torque request limit value TGlim, the second power generation torque request value TG2 is equal to the first power generation torque request value TG1 and increases in the same way as the first power generation torque request value TG1. As the second power generation torque request value TG2 increases as shown in 5(f) in FIG. 5, the electric motor torque command value TM output from the adder/subtractor 123 decreases. However, as the electric motor torque command value TM decreases, the rotational speed N decreases so that the speed deviation ΔN output from the subtractor 120 increases, which results in an increase in the torque command value T as shown in (c) in FIG. 5. Consequently, the electric motor torque command value TM is controlled to remain almost constant.

In this way, if the pump torque TL exceeds the maximum engine torque TEmax, the electric motor 102 does not operate as a generator, but is driven by the power from the battery device 111 and the hydraulic pump 103 is driven by means of the engine 101 and the electric motor 102, even if the state of charge SOC decreases. Even if the state of charge SOC of the battery device 111 decreases, the rotational speed N does not decrease because the hydraulic pump 103 is supplied with enough power during the excavating task. It will be noted that the average charging/discharging current Iave increases as shown in (h) in FIG. 5 so long as the electric motor 102 is driven by the power discharged from the battery device 111, because the discharging current flows into the battery device 111. However, in the average medium load task, the increase amount of the average charging/discharging current Iave is small because the electric current value is small.

When the pump torque TL decreases at a time point t203 as shown in (b) in FIG. 5, the rotational speed N increases slightly as shown in (a) in FIG. 5 so that the absolute value of the speed deviation ΔN between the rotational speed N and the rotational speed command value N* increases (N>N*). As the speed deviation ΔN having a negative value becomes smaller, the torque command value T decreases as shown in (c) in FIG. 5. As the torque command value T decreases, the electric motor torque command value TM output from the adder/subtractor 123 decreases as shown in (d) in FIG. 5. When the electric motor torque command value TM becomes a negative value, the electric motor 102 performs the power generating operation to charge the battery device 111. Accordingly, as shown in (e) in FIG. 5, the state of charge SOC of the battery device 111 increases and approaches the state of charge command value SOC*.

As the battery device 111 is charged so that the state of charge SOC increases, the deviation ΔSOC output from the subtractor 124 decreases. In addition, the second power generation torque request value TG2 decreases as shown in (f) in FIG. 5 and the electric motor torque command value TM increases as shown in (d) in FIG. 5. In other words, the absolute value of the electric motor torque command value TM having a negative value decreases, so that the generated power decreases gradually.

As the electric motor torque command value TM increases as shown in (d) in FIG. 5, the rotational speed N increases. However, the torque command value T output from the rotational speed controller 121 decreases and the engine torque command value TE output from the engine torque limiter 122 decreases. Consequently, the rotational speed N is controlled to remain almost constant.

In this way, when the pump torque TL decreases to be equal to or lower than the maximum engine torque TEmax so that the engine can provide enough power output, the electric motor 102 is driven by means of the engine 101 to operate as a generator, so that the battery device 111 is charged. During the electric motor 102 operates as a generator, the average charging/discharging current Iave increases as shown in (h) in FIG. 5 because the charging current flows into the battery device 111. However, in the average medium load task, the increase amount of the average charging/discharging current Iave is small because the electric current value is small.

When the state of charge SOC reaches the state of charge command value SOC* at a time point t204 as shown in (e) in FIG. 5, the second power generation torque request value TG2 is 0 as shown in (f) in FIG. 5 and the electric motor torque command value TM is also 0 as shown in (d) in FIG. 5. At this time, the rotational speed N is controlled by the rotational speed controller 121 to be equal to the rotational speed command value N*. Thus, the engine torque is in balance with the pump torque TL.

The operations of the control device at the time points t211, t212, t213, t214 are the same as that at the time points t201, t202, t203, t204. The operations between the time points t211 and t221 are the same as that between the time points t201 and t211. The same operations are repeatedly performed after the time point t221, as well.

In this way, in the average medium load task, if the pump torque TL exceeds the maximum engine torque TEmax, the control device causes the electric motor 102 to be operated by the power of the battery device 111 and causes the hydraulic pump 103 to be driven by means of the electric motor 102 and the engine 101. Furthermore, if the pump torque TL is equal to or lower than the maximum engine torque TEmax, the control device causes the electric motor 102 to operate as a generator by means of the engine 101 in order to control the state of charge SOC of the battery device 111 to be equal to the state of charge command value SOC*.

It will be noted that the operations of the control device in the average light load task (FIG. 4) is the same as the operations of the control device in the average medium load task (FIG. 5), as described above. The time points t101, t102, t103, t104, t111, t112, t113, t114, t121 shown in FIG. 4 correspond to the time points t201, t202, t203, t204, t211, t212, t213, t214, t221 shown in FIG. 5, respectively. However, in the average light load task, the maximum value of the pump torque TL is small. Therefore, the maximum value of the electric motor torque command value TM in case that the electric motor 102 operates by the power of the battery device 111 and the maximum value of the absolute value of the electric motor torque command value TM in case that the electric motor 102 operates as a generator are smaller than that in the average medium load task.

—Average Heavy Load Task—

Referring to FIG. 6, operation of the control device in average heavy load tasks will be described. FIG. 6 is a timing chart in which the state of charge SOC of the battery device 111 is smaller than the state of charge command value SOC*, and a condition (at a time point t0) where the average charging/discharging current Iave is larger than the first threshold I1 and smaller than the second threshold I2 is set as the initial condition. It will be noted that the power generation torque request limit value TGlim is set to TGmax at the time point t0.

As shown in (e) in FIG. 6, if the state of charge SOC of the battery device 111 is smaller than the state of charge command value SOC* (SOC*>SOC), the first power generation torque request value TG1 output from the SOC controller 125 is a positive value. As shown in (g) in FIG. 6, the charging request limiter 127 outputs the maximum generator torque TGmax as the power generation torque request limit value TGlim.

At this time, because the deviation ΔSOC is large and the first power generation torque request value TG1 is larger than the maximum generator torque TGmax, the minimum value selecting circuit 126 limits the first power generation torque request value TG1 to the maximum generator torque TGmax, and outputs the maximum generator torque TGmax as the second power generation torque request value TG2 (TG2=TGmax) as shown in (f) in FIG. 6.

Since the torque command value T is equal to or higher than the maximum engine torque TEmax as shown by a dashed line in (c) in FIG. 6, the engine torque limiter 122 outputs the maximum engine torque TEmax as the engine torque command value TE. The electric motor torque command value TM is a negative value and the electric motor 102 thus operates as a generator.

If the sum of the magnitude of the absolute value of the electric motor torque command value TM and the pump torque TL is larger than the maximum engine torque TEmax, the rotational speed N decreases. However, as shown in (c) in FIG. 6, the torque command value T is increased to exceed the maximum engine torque TEmax by the rotational speed controller 121. Therefore, the electric motor torque command value TM is increased by the adder/subtractor 123. In other words, the magnitude of the absolute value of the electric motor torque command value TM decreases. As a result, the rotational speed N is controlled to be equal to the rotational speed command value N*. In other words, the control device in the present embodiment regulates the amount of power generation of the electric motor 102 and controls the rotational speed N so as to be equal to the rotational speed command value N*, depending on the pump torque TL.

When the pump torque TL begins to increase at a time point t301 as shown in (b) in FIG. 6, the rotational speed N decreases slightly as shown in (a) in FIG. 6 so that the speed deviation ΔN between the rotational speed N and the rotational speed command value N* increases (N*>N). As the speed deviation ΔN increases, the torque command value T increases as shown in (c) in FIG. 6. It will be noted that since the torque command value T is equal to or higher than the maximum engine torque TEmax, the engine torque command value TE output from the engine torque limiter 122 is limited to the maximum engine torque TEmax.

As the torque command value T increases, the electric motor torque command value TM output from the adder/subtractor 123 increases. When the value of the electric motor torque command value TM changes from a negative value to a positive value, the power generating operation of the electric motor 102 is finished and the electric motor 102 is driven by the power from the battery device 111. In this way, the electric motor 102 compensates for the shortfall of the maximum engine torque TEmax to the pump torque TL, so that the rotational speed N is controlled to be equal to the rotational speed command value N*.

The maximum value of the pump torque TL in the period from the time point t301 to the time point t303 in FIG. 6 is larger than the maximum value of the pump torque TL in the period from the time point t201 to the time point t203 in FIG. 5. The time points t201 to t221 correspond to the time points t301 to 321, respectively, and they represent the same change in time. Thus, in the average heavy load task, the output of the hydraulic pump 103 in the unit period is larger than that in the average medium load task. As a result, the average heavy load task has a higher average value of the hydraulic load (i.e. a higher output of the hydraulic pump 103) per unit period than that of the average medium load task.

When the pump torque TL decreases at a time point t303 as shown in (b) in FIG. 6, the rotational speed N increases slightly as shown in (a) in FIG. 6 and the absolute value of the speed deviation ΔN between the rotational speed N and the rotational speed command value N* increases (N>N*). As the speed deviation ΔN having a negative value becomes smaller, the torque command value T decreases as shown in (c) in FIG. 6. Since the torque command value T is equal to or higher than the maximum engine torque TEmax, the engine torque limiter 122 outputs the maximum engine torque TEmax as the engine torque command value TE.

As the torque command value T decreases, the electric motor torque command value TM output from the adder/subtractor 123 decreases as shown in (d) in FIG. 6. When the electric motor torque command value TM becomes a negative value, the electric motor 102 performs the power generating operation to charge the battery device 111. Therefore, as shown in (e) in FIG. 6, the state of charge SOC of the battery device 111 increases.

In the period from the time point t0 to the time point t304, the charging current flows into the battery device 111 while the electric motor 102 operates as a generator, and the discharging current flows out of the battery device 111 while the electric motor 102 is driven by the power discharged from the battery device 111. Therefore, as shown in (h) in FIG. 6, in the period from the time point t0 to the time point t304, the average charging/discharging current Iave increases with elapse of time.

When the average charging/discharging current Iave is equal to or larger than the second threshold I2 at the time point t304, the charging request limiter 127 outputs 0 as the power generation torque request limit value TGlim as shown in 6(g) in FIG. 6. As a result, the second power generation torque request value TG2 output from the minimum value selecting circuit 126 is also 0, as shown in (f) in FIG. 6.

Thereby, the charging of the battery device 111 is stopped and the increase in the state of charge SOC is stopped (see (e) in FIG. 6). Since the electric current no longer flows into the battery device 111, the average charging/discharging current Iave begins to decrease from the time point t304, as shown in (h) in FIG. 6. In other words, if the average charging/discharging current Iave increases to exceed the second threshold I2, the charging to the battery device 111 is limited and the average charging/discharging current Iave, which has increased until this point, turns to decrease.

As shown in (b) in FIG. 6, when the pump torque TL begins to increase at a time point t301, the rotational speed N decreases slightly as shown in (a) in FIG. 6 so that the speed deviation ΔN between the rotational speed N and the rotational speed command value N* increases (N*>N). As the speed deviation ΔN increases, the torque command value T and the engine torque command value TE increase as shown in (c) in FIG. 6. Because the torque command value T is equal to or lower than the maximum engine torque TEmax in the period from the time point t311 to the time point t312, the engine torque command value TE is equal to the torque command value T.

As shown in (c) in FIG. 6, when the torque command value T exceeds the maximum engine torque TEmax at the time point t312, the engine torque command value TE is limited to the maximum engine torque TEmax. This results in a difference between the torque command value T and the engine torque command value TE, so that the electric motor torque command value TM output from the adder/subtractor 123 increases as shown in (d) in FIG. 6. In other words, torque assistance by the electric motor 102 occurs from the time point t312, so that the hydraulic pump 103 is driven by means of the engine 101 and the electric motor 102. The electric motor 102 compensates for the shortfall of the maximum engine torque TEmax to the pump torque TL, so that the rotational speed N is controlled to be equal to the rotational speed command value N*.

When the electric motor 102 is driven by the power discharged from the battery device 111, the state of charge SOC of the battery device 111 decreases as shown in (e) in FIG. 6. As shown in (g) in FIG. 6, the power generation torque request limit value TGlim is set to 0. Because the first power generation torque request value TG1 (not shown) is larger than the power generation torque request limit value TGlim, the second power generation torque request value TG2 is equal to the power generation torque request limit value TGlim, i.e. 0, as shown in (f) in FIG. 6.

When the pump torque TL decreases at a time point t313 as shown in (b) in FIG. 6, the rotational speed N increases slightly as shown in (a) in FIG. 6 so that the absolute value of the speed deviation ΔN between the rotational speed N and the rotational speed command value N* increases (N>N*). As the speed deviation ΔN having a negative value becomes smaller, the torque command value T decreases as shown in (c) in FIG. 6. As the torque command value T decreases, the electric motor torque command value TM output from the adder/subtractor 123 decreases as shown in (d) in FIG. 6. Here, the second power generation torque request value TG2 is equal to the power generation torque request limit value TGlim and limited to 0. Therefore, even if the torque command value T is smaller than the maximum engine torque TEmax, the electric motor torque command value TM would not become a negative value. In other words, the electric motor 102 does not perform the power generating operation. If such a situation continues that no charging current flows into the battery device 111, the average charging/discharging current Iave decreases with elapse of time as shown in (h) in FIG. 6.

When the average charging/discharging current Iave is equal to or lower than the first threshold I1 at the time point t315 as shown in (h) in FIG. 6, the charging request limiter 127 sets the power generation torque request limit value TGlim to the maximum generator torque TGmax as shown in (g) in FIG. 6. Therefore, the maximum generator torque TGmax is output as the second power generation torque request value TG2 from the minimum value selecting circuit 126, as shown in (f) in FIG. 6. Accordingly, the electric motor torque command value TM becomes a negative value as shown in (d) in FIG. 6 and the electric motor 102 thus operates as a generator, so that the charging to the battery device 111 is resumed from the time point t315.

The operations from the time point t315 to the time point t321 are the same as the operations from the time point t0 to the time point t301. After the time point t321, the same operations are repeatedly performed as that after the time point t301.

In this way, in the average heavy load task, the control device causes the electric motor 102 to be operated by the power of the battery device 111 if the pump torque TL exceeds the maximum engine torque TEmax. If the pump torque TL is equal to or lower than the maximum engine torque TEmax and the second power generation torque request value TG2 is the maximum generator torque TGmax, the control device causes the electric motor 102 to operate as a generator by means of the engine 101, so that the state of charge SOC of the battery device 111 is increased towards the state of charge command value SOC*.

Furthermore, in the average heavy load task, if the average charging/discharging current Iave is equal to or larger than the second threshold I2, the charging request limiter 127 sets the power generation torque request limit value TGlim to 0. Therefore, even if the pump torque TL is equal to or lower than the maximum engine torque TEmax (from the time point t304 to the time point t312, and from the time point t313 to the time point t315), the power generating operation of the electric motor 102 is prohibited if the power generation torque request limit value TGlim is 0. In contrast, in the average heavy load task, even in the state where the power generation to the battery device 111 is prohibited (from the time point t304 to the time point t315), it is allowed to drive the electric motor 102 by the power of the battery device 111 if the pump torque TL increases to exceed the maximum engine torque TEmax (from the time point t312 to the time point t313). Hence, in the present embodiment, even if the state of charge SOC of the battery device 111 is lower than the state of charge command value SOC*, deterioration of the battery device 111 can be prevented by limiting the charging of the battery device 111 when the average charging/discharging current Iave is equal to or higher than the second threshold I2. Furthermore, according to the present embodiment, if the pump torque TL exceeds the maximum engine torque TEmax, the hydraulic pump 103 is supplied with enough power with the torque assistance of the electric motor 102. Thereby, a decrease in the rotational speed N can be prevented in the excavating task.

—Average Superheavy Load Task—

Referring to FIG. 7, operations of the control device in average superheavy load tasks will be described. FIG. 7 is a timing chart in which the state of charge SOC of the battery device 111 is smaller than the state of charge command value SOC*, and a condition (at a time point t0) where the average charging/discharging current Iave is larger than the first threshold I1 and smaller than the second threshold I2 is set as the initial condition. It will be noted that TGlim is set to 0 at the time point t0.

In FIG. 7, the pump torque TL begins to increase at a time point t401 (see (b) in FIG. 7), the torque command value T exceeds the maximum engine torque TEmax at a time point t402 (see (c) in FIG. 7), and the pump torque TL begins to decrease at a time point t403 (see (b) in FIG. 7). The operations of the control device at the time points t411, t412, t413 are the same as that at the time points t401, t402, t403. The operations between the time points t411 and t421 are the same as that between the time points t401 and t411. The same operations are repeatedly performed after the time point t421, as well.

As shown in FIG. 7, in the average superheavy load task, the pump torque TL, which represents the hydraulic load, is larger than that in the average heavy load task. Therefore, the electric motor torque is needed to be larger. Because the discharging current required for operating the electric motor 102 in the average superheavy load task is larger than that in the average heavy load task, the average charging/discharging current Iave exceeds the second threshold I2 every time when an operation is performed by the operator (at the time point t403 and t413). Therefore, even if the charging of the electric motor 102 is prohibited, the average charging/discharging current Iave would not decrease to the first threshold I1 before the next operation is performed. Thus, the charging request limiter 127 continues to output 0 as the power generation torque request limit value TGlim.

In this way, with the control device, in the average superheavy load task, the power generating operation of the electric motor 102 is prohibited and the charging of the battery device 111 is not performed. Therefore, although the average value of the hydraulic load per unit period in the average superheavy load task is higher than that in the average heavy load task, the average charging current of the battery device 111 is set to 0, i.e. the charging is not performed, so that the increase amount of the average charging/discharging current Iave of the battery device 111 is suppressed. As a result, performance of the battery device 111 can be maintained over a long period.

As described above, in the average light/medium load task, the discharging of the battery device 111 is performed depending on the tasks, and the charging is also performed in order to keep the state of charge SOC at the state of charge command value SOC*. In the average heavy load task, the discharging current of the battery device 111 is larger than the average light/medium load task. Therefore, the average charging/discharging current Iave is equal to or higher than the second threshold I2, so that the charging of the battery device 111 is limited. In the average heavy load task, the discharging current of the battery device 111 is smaller than that in the average superheavy load task. Therefore, the average charging/discharging current Iave is equal to or lower than the first threshold I1 by limiting the charging, even though the charging of the battery device 111 is also performed. In the average superheavy load task, the charging of the battery device 111 is not performed.

In the present embodiment, by the control device controlling the charging/discharging of the battery device 111 in the configuration described above, the relationship between the discharging current that flows into the battery device 111 per unit period (hereinafter, average discharging current) and the charging current that flows into the battery device 111 per unit period (hereinafter, average charging current) in each task is as follows.

Figure 8:
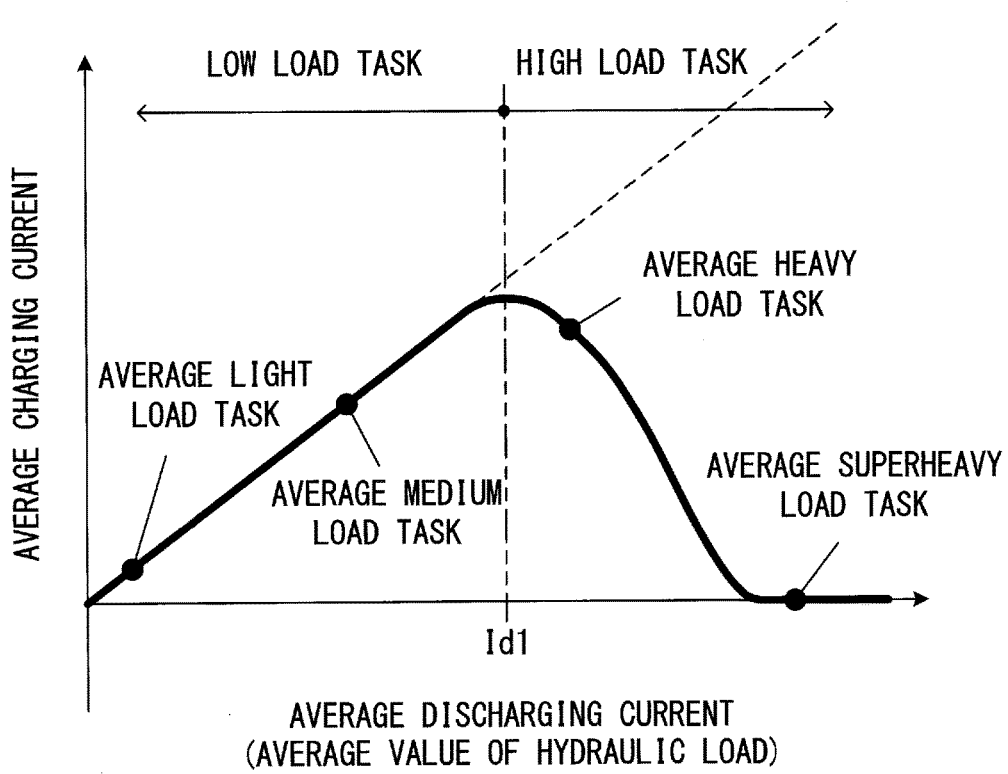
FIG. 8 is a schematic view showing the relationship between the average discharging current and the average charging current.

FIG. 8 is a schematic view showing the relationship between the average discharging current and the average charging current. The abscissa represents the average discharging current and the ordinate represents the average charging current. The average discharging current of the battery device 111 is larger as the average value of the magnitude of the hydraulic load per unit period is higher, i.e. the maximum value of the pump torque TL in (b) in FIG. 4, (b) in FIG. 5, (b) in FIG. 6 or (b) in FIG. 7 is higher or the time period during which the pump torque TL is as the maximum value is longer. Therefore, the average discharging current in the abscissa may be replaced by the average value of the hydraulic load. Furthermore, the abscissa may be replaced by the average value of the positive parts of the electric motor torque command value TM per unit period in (d) in FIG. 4, (d) in FIG. 5, (d) in FIG. 6 or (d) in FIG. 7, while the ordinate may be replaced by the value of which the sign of the average value of the negative parts of the electric motor torque command value TM per unit period in (d) in FIG. 4, (d) in FIG. 5, (d) in FIG. 6 or (d) in FIG. 7. Although the average values per unit period is shown, the same trend can be observed also in the accumulated values per unit period.

As shown in FIG. 8, in low load tasks such as the average light load task (see FIG. 4) and the average medium load task (see FIG. 5) where the average discharging current is equal to or lower than the predetermined amount Id1, the average discharging current and the average charging current are equal to each other because the battery device 111 is charged by the same amount as that it is discharged. When the low load task is performed, the average charging current of the battery device 111 per unit period increases while the average discharging current of the battery device 111 per unit period increases, as shown in FIG. 8. In other words, when the low load task is performed where the average value of the hydraulic load per unit period is lower than a predetermined value (a value corresponding to the predetermined amount Id1), the average charging current of the battery device 111 per unit period increases with the increase in the average value of the hydraulic load per unit period. That is, in the average medium load task (see FIG. 5) where the average value of the hydraulic load per unit period is higher than that in the average light load task (see FIG. 4), the average charging current of the battery device 111 is higher.

In contrast, in high load tasks such as the average heavy load task (see FIG. 6) and in the average superheavy load task (see FIG. 7) where the average discharging current exceeds the predetermined amount Id1, the average charging current is smaller than the discharging current. When the high load task is performed, the average charging current of the battery device 111 per unit period decreases as the average discharging current of the battery device 111 per unit period increases, as shown in the figure. In other words, when the high load task is performed where the average value of the hydraulic load per unit period is higher than a predetermined value (a value corresponding to the predetermined amount Id1), the average charging current of the battery device 111 per unit period decreases with the increase in the average value of the hydraulic load per unit period. That is, in the average superheavy load task (see FIG. 7) where the average value of the hydraulic load per unit period is higher than that in the average heavy load task (see FIG. 6), the average charging current of the battery device 111 is lower.

In any of the exemplary tasks, the average charging/discharging current Iave can be suppressed by limiting the charging, while performing the discharging required for the task. As a result, performance of the battery device 111 can be maintained for a long time, while ensuring workability.

During the task corresponding to the average heavy load task shown in FIG. 6 is continuously performed, the state of charge SOC of the battery device 111 decreases gradually. During the task corresponding to the average superheavy load task shown in FIG. 7 is continuously performed, the state of charge SOC of the battery device 111 simply decreases and never increases. Therefore, the control device according to the present embodiment is configured to display images including information of the state of charge on the display screen of the display device 134 in order to inform the operator of the fact that the task corresponding to the average heavy load task or the average superheavy load task is continuously performed so that the state of charge SOC of the battery device 111 decreases to the threshold SOCt.

Figure 9:
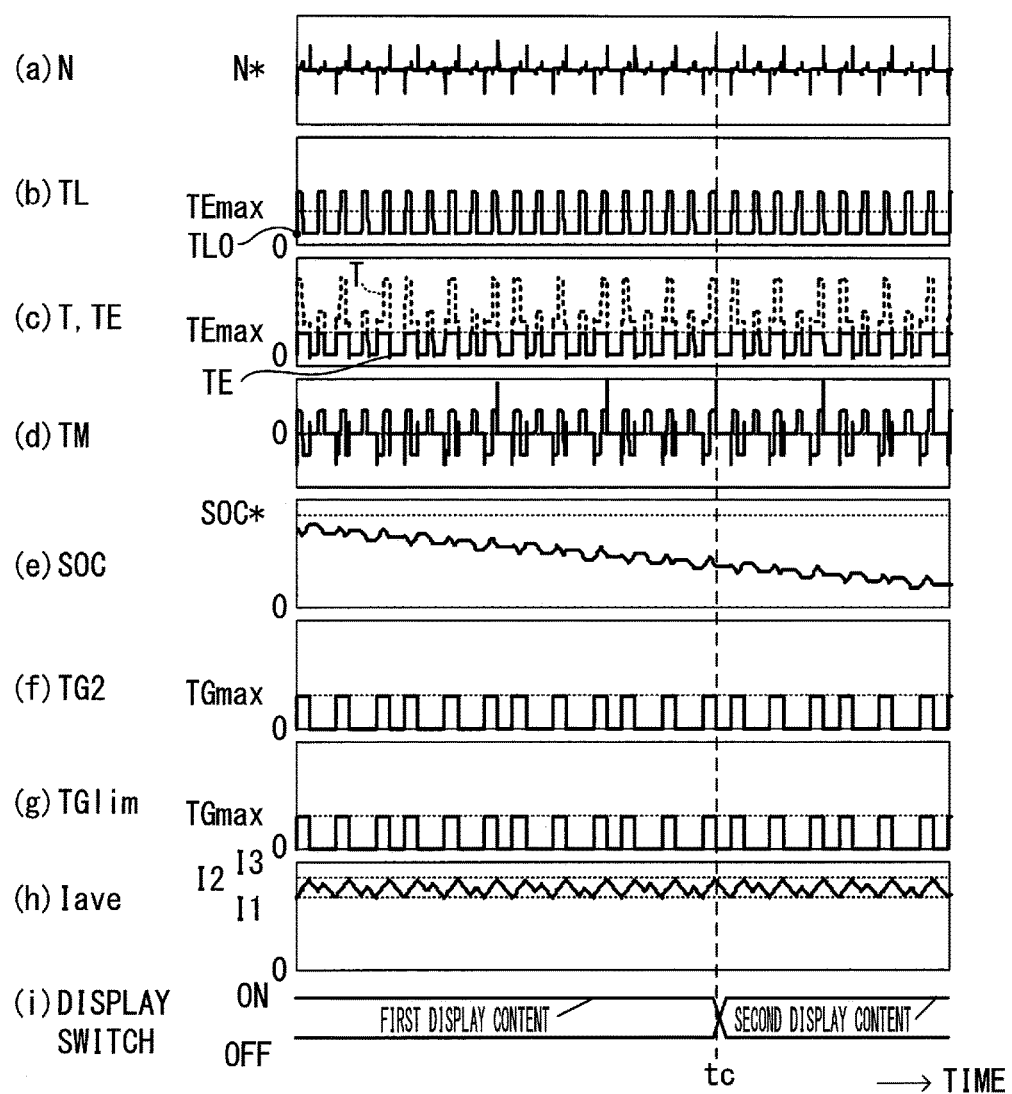
FIG. 9 is a timing chart showing operation of the control device in case that a heavy load task is continuously performed.

FIG. 9 is a timing chart showing operation of the control device in case that the average heavy load task is continuously performed in such a manner that the state of charge gradually decreases with elapse of time. FIG. 9 shows a timing chart in case that a task having the same level of load as that of the average heavy load task shown in FIG. 6 is performed for a long time. The abscissa in FIG. 9 represents elapsed time. The ordinate in (a) in FIG. 9 represents the rotational speed N of the engine 101 and the electric motor 102, and the ordinate in (b) in FIG. 9 represents the pump torque TL representing the hydraulic load. The ordinate in (c) in FIG. 9 represents the magnitude of the torque command value T shown by a dashed line and the magnitude of the engine torque command value TE shown by a solid line. The ordinate in (d) in FIG. 9 represents the electric motor torque command value TM and the ordinate in (e) in FIG. 9 represents the state of charge SOC. The ordinate in (f) in FIG. 9 represents the second power generation torque request value TG2, the ordinate in (g) in FIG. 9 represents the power generation torque request limit value TGlim, and the ordinate in (h) in FIG. 9 represents the average charging/discharging current Iave. (i) in FIG. 9 shows whether the first display content 131 or the second display content 132 is to be displayed on the display screen of the display device 134.

When the task corresponding to the average heavy load task is continuously performed as shown in FIG. 9, the state of charge SOC of the battery device 111 decreases with elapse of time. At the time point tc, when it is determined that the average charging/discharging current Iave is equal to or higher than the threshold It and the state of charge SOC of the battery device 111 is equal to or lower than the threshold SOCt, the display content switching determiner 130 outputs a second switching signal to the switcher 133. Thereby, the image to be displayed on the display screen of the display device 134 is switched from the first display content 131 to the second display content 132. Since the second display content 132 includes at least information of the state of charge SOC of the battery device 111, the operator will know that the state of charge SOC of the battery device 111 decreases. Looking at the display content, the operator can regulate the way of working, so that the operator can avoid a situation where the torque assistance of the electric motor 102 suddenly stops during the task and the task has to be interrupted.

According to the control device of the construction machine according to the embodiment described above, the following advantageous effect can be achieved.

(1) The control device controls the charging/discharging of the battery device 111 in such a manner that if the heavy load tasks having a high output of the hydraulic pump 103 and the light load tasks having a low output of the hydraulic pump 103 are alternately performed per unit period, the average value of the charging current of the battery device 111 per unit period increases when the output of the hydraulic pump 103 during the heavy load task is increased or the time proportion of the heavy load task in the unit period is increased (cf. the low load task in FIG. 8), while the average value of the charging current of the battery device 111 per unit period decreases when the output of the hydraulic pump 103 during the heavy load task is increased or the time proportion of the heavy load task in the unit period is increased (cf. the high load task in FIG. 8).

It is thereby prevented that the average value of the charging/discharging current Iave flowing into and out of the battery device 111 becomes to be too large, so that performance of the battery device 111 can be maintained for a long time.

Particularly, in the high load task (see FIG. 8), the control device controls the charging/discharging of the battery device 111 in such a manner that the average charging current of the battery device 111 per unit period decreases to a larger extent in a task where the average value of the hydraulic load per unit period is higher. Because the charging/discharging current flowing into and out of the battery device 111 can be reduced by limiting the charging of the battery device 111 in the high load task, the electric motor 102 can be driven by the power discharged from the battery device 111 and the hydraulic pump 103 can be driven by the electric motor 102 and the engine 101 when the hydraulic load occurs. Therefore, a reduction in work rate or a lowering operability can be suppressed.

(2) The display controller 100 determines whether the state of charge SOC of the battery device 111 is equal to or lower than the threshold SOCt or not. If it is determined that the state of charge SOC of the battery device 111 is equal to or lower than the threshold SOCt, the display controller 100 switches the display screen of the display device 134 so as to display at least information of the state of charge SOC of the battery device 111 on the display screen. Thereby, the operator will know that the state of charge SOC of the battery device 111 decreases and can regulate the way of working, so that the operator can avoid a situation where the torque assistance of the electric motor 102 suddenly fails during the task and the task has to be interrupted.

The following variations are also encompassed within the scope of the present invention. It may be possible that one or more of the variations are combined with the embodiment described above.

(First Variation)

In the embodiment described above, the magnitude of the power generation torque request limit value TGlim corresponding to the charging current limit value that is set for limiting the charging current of the battery device 111 becomes the maximum generator torque TGmax if the average charging/discharging current Iave is equal to or lower than the first threshold I1, and it becomes 0 if the average charging/discharging current Iave is equal to or higher than the second threshold I2. However, the present invention is not limited to this configuration. For example, the power generation torque request limit value TGlim corresponding to the charging current limit value in case that the average charging/discharging current Iave is equal to or higher than the second threshold I2 may be set to a value that is higher than 0 and lower than the maximum generator torque TGmax.

(Second Variation)

In the embodiment described above, the example has been described where the maximum electric motor torque TMmax, which corresponds to the discharging current limit value, is a constant value, regardless of the average charging/discharging current Iave. However, the present invention is not limited to this configuration. It may be also possible that the magnitude of the discharging current in case that the average charging/discharging current Iave is equal to or higher than the second threshold I2 is smaller than the magnitude of the discharging current limit value in case that the average charging/discharging current Iave is equal to or lower than the first threshold I1, in the same manner as the charging current limit value. In this case, it is preferable that the magnitude of the charging current limit value is set to be smaller than the magnitude of the discharging current magnitude in case that the average charging/discharging current Iave is equal to or higher than the second threshold I2. Furthermore, it is preferable that limit values are set in such a manner that the difference between the magnitude of the charging current limit value in case that the average charging/discharging current Iave is equal to or lower than the first threshold I1 and the magnitude of the charging current limit value in case that the average charging/discharging current Iave is equal to or higher than the second threshold I2 is larger than the difference between the magnitude of the discharging current limit value in case that the average charging/discharging current Iave is equal to or lower than the first threshold I1 and the magnitude of the discharging current limit value in case that the average charging/discharging current Iave is equal to or higher than the second threshold I2.

(Third Variation)

In the embodiment described above, the case has been described where the average charging/discharging current Iave is used as a determination value that is an indicator indicating a degree of deterioration of the battery device 111 in order to determine whether the magnitude of the charging current limit value of the battery device 111 should be changed or not. However, the present invention is not limited to this configuration. The temperature of the battery device 111 may be used as the determination value that is the indicator indicating the degree of deterioration of the battery device 111. If the temperature of the battery device 111 becomes too high, the battery device 111 tends to be rapidly degraded so that the service life of the battery device 111 is shortened. In this case, instead of the current detector 113 and the average charging/discharging current calculator 128 that function as determination value setting means as shown in FIG. 2, a temperature detector that detects the temperature of the battery device 111 is provided. In this variation, the charging request limiter 127 is configured to output 0 as the power generation torque request limit value TGlim if the temperature of the battery device 111 is higher than a threshold, and output the maximum generator torque TGmax as the power generation torque request limit value TGlim if the temperature of the battery device 111 is lower than the threshold. In this variation, the service life of the battery device 111 is extended by suppressing a rise in temperature of the battery device 111.

(Fourth Variation)

In the embodiment described above, the engine 101 and the electric motor 102 rotate at the same rotational speed. However, the present invention is not limited to this configuration. The engine 101 and the electric motor 102 may be coupled via a transmission. In this case, it is necessary to convert the rotational speed command value N*, the rotational speed N, and the like in consideration of a gear ratio.

(Fifth Variation)

In the embodiment described above, the example has been described where the display screen of the display device 134 is switched from the first display content 131 to the second display content 132 if the state of charge SOC of the battery device 111 is equal to or lower than the threshold SOC and the average charging/discharging current Iave is equal to or lower than the threshold It. However, the present invention is not limited to this configuration. The display screen of the display device 134 may be switched from the first display content 131 to the second display content 132 if the state of charge SOC of the battery device 111 is equal to or lower than the threshold SOCt, regardless of the average charging/discharging current Iave.

(Sixth Variation)

The thresholds are not limited to that in the embodiment described above. For example, in the foregoing description, the threshold It used for determining whether the switching of the display device 134 should be performed or not and the second threshold I2 used for determining whether the magnitude of the power generation torque request limit value TGlim, which corresponds to the charging current limit value, should be changed from TGmax to 0 or not are the same. However, these thresholds may be different to each other.

(Seventh Variation)

The configuration of the main controller 100a, the engine controller 100b, and the display controller 100c is not limited to that in the embodiment described above. Processing means such as the rotational speed controller 121, the charging request limiter 127, the SOC controller 125, the average charging/discharging current calculator 128, and the like may be configured in hardware or implemented as a software which runs on a hardware.

(Eighth Variation)

Although the hydraulic excavator has been described as an example of the construction machine, the present invention is not limited to this. The present invention is also applicable to other construction machines such as a wheel loader, a forklift, a telehandler, or a lift truck, for example.

The present invention is not limited to the embodiments described above, but other forms that are conceivable within the scope of the technical idea of the present invention are encompassed within the scope of the present invention, unless impairing the features of the present invention.

What is claimed is:

1. A control device of construction machine that performs tasks by driving a hydraulic pump by means of an electric motor that is driven by electric power of a battery device that is capable to charge and discharge and an engine that is mechanically coupled to the electric motor, comprising:
a charging/discharging control unit that controls the charging/discharging of the battery device in such a manner that,
in case that a heavy load task where an output of the hydraulic pump is large and a light load task where the output of the hydraulic pump is small are alternately performed,
when the output of the hydraulic pump during the heavy load task is increased or a time proportion of the heavy load task in the unit period is increased, an average value of charging current of the battery device per the unit period increases, and
when the output of the hydraulic pump during the heavy load task is further increased or the time proportion of the heavy load task in the unit period is further increased, then the average value of the charging current of the battery device per the unit period decreases.

2. The control device of the construction machine according to claim 1, further comprising:
a storage device that stores a charging current limit value that is set for limiting the charging current of the battery device, wherein:
the charging/discharging control unit is configured to include a limit value changing unit that changes the magnitude of the charging current limit value, and a determination value setting unit that sets a determination value that is an indicator indicating a degree of deterioration of the battery device; and
if the determination value is larger than a threshold, the limit value changing unit changes the magnitude of the charging current limit value to be smaller than the magnitude in the case where the determination value is smaller than the threshold.

3. The control device of the construction machine according to claim 2, further comprising:
a current detecting unit that detects the charging/discharging current flowing into and out of the battery device; and
an average charging/discharging current calculating unit that calculates an average value of the charging/discharging current detected by the current detecting unit, wherein
the determination value is an average value of the charging/discharging current calculated by the average charging/discharging current calculating unit.

4. The control device of the construction machine according to claim 2, further comprising:
a temperature detecting unit that detects the temperature of the battery device, wherein
the determination value is the temperature that is detected by the temperature detecting unit.

5. The control device of the construction machine according to claim 1, further comprising:
a storage device that stores a charging current limit value that is set for limiting the charging current of the battery device and a discharging current limit value that is set for limiting the discharging current of the battery device, wherein:
the charging/discharging control unit is configured to include a limit value changing unit that changes the magnitude of the charging current limit value, and a determination value setting unit that sets a determination value that is an indicator indicating a degree of deterioration of the battery device; and the limit value changing unit changes the magnitude of the charging current limit value to be smaller than the magnitude of the discharging current limit value if the determination value is larger than a threshold.

6. The control device of the construction machine according to claim 5, wherein:
a difference, between the magnitude of the charging current limit value of the battery device in case that the determination value is smaller than the threshold and the magnitude of the charging current limit value of the battery device in case that the determination value is larger than the threshold, is larger than
a difference, between the magnitude of the discharging current of the battery device in case that the determination value is smaller than the threshold and the magnitude of the discharging current limit value of the battery device in case that the determination value is larger than the threshold.

7. The control device of the construction machine according to claim 1, further comprising:
a state of charge determining unit that determines whether the state of charge of the battery device is smaller than a predetermined value or not; and
a display control unit that switches an image displayed on a display screen of the display device to display at least information of the state of charge of the battery device on the image displayed on the display screen, when it is determined by the state of charge determining unit that the state of charge of the battery device is smaller than the predetermined value.

8. A control device of construction machine that performs tasks by driving a hydraulic pump by means of an electric motor that is driven by power of a battery device that is capable to charge and discharge and an engine that is mechanically coupled to the electric motor, wherein:
a difference, between a magnitude of a charging current limit value of the battery device in case that an average value of a charging/discharging current of the battery device is small and a magnitude of a charging current limit value of the battery device in case that an average value of a charging/discharging current of the battery device is large, is larger than a difference, between a magnitude of a discharging current limit value of the battery device in case that an average value of a charging/discharging current of the battery device is small and a magnitude of a discharging current limit value of the battery device in case that an average value of a charging/discharging current of the battery device is large.

* * * * *